United States Patent
Meiri et al.

(10) Patent No.: US 10,496,668 B1
(45) Date of Patent: Dec. 3, 2019

(54) OPTIMIZED TENDER PROCESSING OF HASH-BASED REPLICATED DATA

(71) Applicant: EMC Corporation, Hopkinton, MA (US)

(72) Inventors: David Meiri, Cambridge, MA (US); Xiangping Chen, Sherborn, MA (US); William R. Stronge, Westford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 746 days.

(21) Appl. No.: 15/195,109

(22) Filed: Jun. 28, 2016

(51) Int. Cl.
*G06F 16/00* (2019.01)
*G06F 16/27* (2019.01)
*G06F 16/22* (2019.01)

(52) U.S. Cl.
CPC .......... *G06F 16/27* (2019.01); *G06F 16/2255* (2019.01)

(58) Field of Classification Search
CPC ............................. G06F 16/27; G06F 16/2255
USPC ........................................................ 707/637
See application file for complete search history.

(56) References Cited

U.S. PATENT DOCUMENTS

| | | | |
|---|---|---|---|
| 7,386,668 B2 * | 6/2008 | Longinov | G06F 11/2064 709/228 |
| 7,873,619 B1 * | 1/2011 | Faibish | G06F 16/13 707/705 |
| 2012/0017060 A1 * | 1/2012 | Kapanipathi | G06F 3/0608 711/162 |

* cited by examiner

*Primary Examiner* — Monica M Pyo
(74) *Attorney, Agent, or Firm* — Krishnendu Gupta; Lesley Leonessa

(57) ABSTRACT

A system, computer program product, and computer-executable method of optimizing replication between a first Content Addressable Storage (CAS) system and a second CAS system, the system, computer program product, and computer-executable method including analyzing the first CAS system and the second CAS system to determine an amount of differences between the first CAS system and the second CAS system, upon determining that the amount of differences are below a threshold amount, sending a set of replication information to the second CAS system, wherein the set of information includes a first address and a first hash for a portion of data stored on the first CAS system, analyzing, at the second CAS system, the set of replication information to determine whether to request that the first CAS system send data associated with the set of replication information; upon a negative determination, sending the data associated with the set of replication information.

20 Claims, 8 Drawing Sheets

Target System 305B

Data Management Module 310B

A2H Table 315B

| Addr | Hashhandle |
|---|---|
| 0 | Hh1 |
| 1 | Hh2 |
| 2 | Hh4 |
| 4 | Hh1 |
| 5 | hh10 |

HMD Table 320B

| Hashhandle | Hash |
|---|---|
| Hh1 | Ha |
| Hh2 | Hb |
| Hh3 | Hc |
| Hh4 | Hd |
| hh10 | He |

Replication Management 325B

Source System 305A

Data Management Module 310A

A2H Table 315A

| Addr | HashHandle |
|---|---|
| 0 | Hh1 |
| 1 | Hh2 |
| 2 | Hh3 |
| 4 | Hh1 |
| 5 | hh5 |

HMD Table 320A

| Hashhandle | Hash |
|---|---|
| Hh1 | Ha |
| Hh2 | Hb |
| Hh3 | Hd |
| hh5 | He |

Replication Management 325A

OPTIMIZED TENDER PROCESSING OF HASH-BASED REPLICATED DATA

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY

A system, computer program product, and computer-executable method of optimizing replication between a first Content Addressable Storage (CAS) system and a second CAS system, the system, computer program product, and computer-executable method including analyzing the first CAS system and the second CAS system to determine an amount of differences between the first CAS system and the second CAS system, upon determining that the amount of differences are below a threshold amount, sending a set of replication information to the second CAS system, wherein the set of information includes a first address and a first hash for a portion of data stored on the first CAS system, analyzing, at the second CAS system, the set of replication information to determine whether to request that the first CAS system send data associated with the set of replication information; upon a negative determination, sending the data associated with the set of replication information.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 3B is a simplified illustration of a replicated data storage system after replication has been completed, in accordance with an embodiment of the present disclosure;

Like reference symbols in the various drawings indicate like elements.

DETAILED DESCRIPTION

Figure 1:
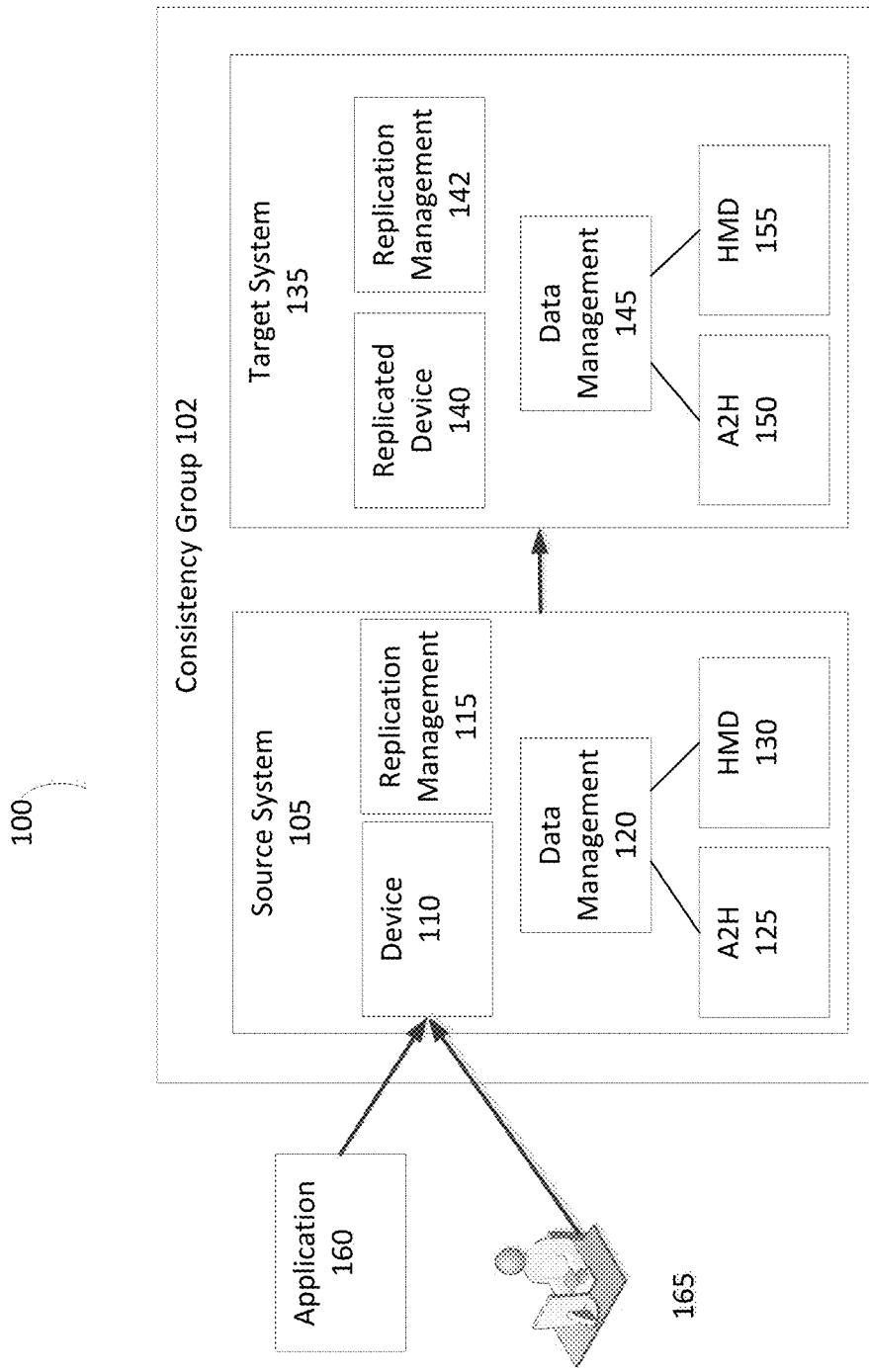
FIG. 1 is a simplified illustration of a replicated data storage system, in accordance with embodiments of the present disclosure.

Traditionally, data storage systems use replication to maintain data between a source site and a target site. Typically, between replication sites, the state of data can vary based on the state of replication. Generally, during some states of replication, data can be nearly identical or be completely different. Traditionally, most replicated data storage system apply one or two methods of replication. Conventionally, improvements to methods of replication would be beneficial to the data storage industry.

Traditionally, a full comparison of data between a source and target site is very expensive, as all data needs to be read and shipped across the communication links. Generally, hash-based comparisons remove the need to ship all data across communication links, but still requires a lengthy set of compare operations and tracking which pages differ. Typically, a full copy, ignoring the unique circumstances requires shipping all the data from the source site or, if using hash-based replication, processing all data on target as writes which results in every hash handle being incremented and immediately decremented, which is an expensive array operation. Conventionally, in some embodiments, trusting a user and proceeding assuming data is identical risks data corruption in case of a user error.

In many embodiments, the current disclosure may enable a data storage system to optimize replication between replication sites. In various embodiments, the current disclosure may enable optimization of replication based on the state of data at the replication sites. In certain embodiments, the current disclosure may enable a data storage system to make use of hints and/or knowledge of a state of data at each of the replication sites to expedite data storage. In some embodiments, the current disclosure may enable expedited replication for specific scenarios where data may be at a known state at a source and target site.

Hash-Based Replication

In a Content Addressable Storage (CAS) array, data is stored in blocks, for example of 4 KB, where each block has a unique large hash signature, for example of 20 bytes, saved on Flash memory. As described herein, hash signatures are accessed by small in-memory handles (Called herein short hash handles), for example of 5 bytes. These handles are unique to each array, but not necessarily unique across arrays. When replicating between two CAS arrays, it is much more efficient to use hash signatures instead of sending the full block. If the target already has the data block corresponding to the hash signature, there is no need to send the corresponding data. However, reading the hash signatures may be expensive, and is wasteful if the target does not have the data (in this case it is faster to send the data without a hash signature, and let the target calculate the hash signature.) While the short hash handles are readily available without the need to read from Flash, since the short hash handles are not unique, they cannot be easily used to check if a target contains a hash signature. In some implementations, short hash handles are shortcuts for hash signatures, and can give a reliable hint of the existence of a hash signature in an array. Described herein is an approach to use these short hash handles, verify them through the hash signature, and send the data as needed. While the description describes using this approach with de-duplication storage devices, it would be appreciated by one of ordinary skill in the art that the approach described herein may be used with any type of storage device including those that do not use de-duplication.

The examples described herein include a networked memory system. The networked memory system includes multiple memory storage units arranged for content addressable storage of data. The data is transferred to and from the storage units using separate data and control planes. Hashing is used for the content addressing, and the hashing produces evenly distributed results over the allowed input range. The hashing defines the physical addresses so that data storage makes even use of the system resources.

A relatively small granularity may be used, for example with a page size of 4 KB, although smaller or larger block sizes may be selected at the discretion of the skilled person. This enables the device to detach the incoming user access pattern from the internal access pattern. That is to say the incoming user access pattern may be larger than the 4 KB or other system-determined page size and may thus be converted to a plurality of write operations within the system, each one separately hashed and separately stored.

Content addressable data storage can be used to ensure that data appearing twice is stored at the same location. Hence unnecessary duplicate write operations can be identified and avoided. Such a feature may be included in the present system as data deduplication. As well as making the system more efficient overall, it also increases the lifetime of those storage units that are limited by the number of write/erase operations.

The separation of Control and Data may enable a substantially unlimited level of scalability, since control operations can be split over any number of processing elements, and data operations can be split over any number of data storage elements. This allows scalability in both capacity and performance, and may thus permit an operation to be effectively balanced between the different modules and nodes.

The separation may also help to speed the operation of the system. That is to say it may speed up Writes and Reads. Such may be due to:

(a) Parallel operation of certain Control and Data actions over multiple Nodes/Modules
(b) Use of optimal internal communication/networking technologies per the type of operation (Control or Data), designed to minimize the latency (delay) and maximize the throughput of each type of operation.

Also, separation of control and data paths may allow each Control or Data information unit to travel within the system between Nodes or Modules in the optimal way, meaning only to where it is needed and if/when it is needed. The set of optimal where and when coordinates is not the same for control and data units, and hence the separation of paths ensures the optimization of such data and control movements, in a way which is not otherwise possible. The separation is important in keeping the workloads and internal communications at the minimum necessary, and may translate into increased optimization of performance.

De-duplication of data, meaning ensuring that the same data is not stored twice in different places, is an inherent effect of using Content-Based mapping of data to D-Modules and within D-Modules.

Scalability is inherent to the architecture. Nothing in the architecture limits the number of the different R, C, D, and H modules which are described further herein. Hence any number of such modules can be assembled. The more modules added, the higher the performance of the system becomes and the larger the capacity it can handle. Hence scalability of performance and capacity is achieved.

Further information about Hash-Based Replication may be found in U.S. Pat. No. 9,378,106 issued on Jun. 28, 2016, assigned to EMC Corporation of Hopkinton, Mass. and is hereby incorporated by reference in its entirety.

Optimized Tender Processing of Hash-Based Replicated Data

In many embodiments, the current disclosure may enable a replicated data storage system to expedite replication between a source site and a target site. In various embodiments, the current disclosure may enable a replicated data storage system to modify a replication method to reduce latency of replication between a source and target site. In certain embodiments, the current disclosure may enable a replication data storage system to analyze a state of data and/or replication between a source site and a target site.

In some embodiments, a user and/or administrator may be enabled to provide a replication data storage system a hint and/or state information related to data in a replicated data storage system. In other embodiments, a replication data storage system may be enabled to recognize one or more factors contributing to a state of data within a replicated data storage system. In most embodiments, a state of data within a replicated data storage system may affect latency and/or amount of time to replicate data between a source site and a target site. In various embodiments, knowing a state of data of a replicated data storage system may enable the replicated data storage system to modify replication methods to reduce an amount of latency and/or time to complete replication.

In many embodiments, consider a replication setup where there may be a strong reason to believe that data in a source site may equal the data on a target site, or may be identical to a high degree. For example, in an embodiment, nearly identical data may be the case after a short link failure (i.e., only writes that occurred during the failure may not be on the target), or after a user manually shipped and installed data to a target site that they may be identical, or nearly identical, to data on a source site. In various embodiments, the current disclosure may enable a method to optimize a full-copy operation that may require a minimal amount of work for each page of data that is identical on source and target sites.

In most embodiments, a replication data storage system may be enabled to optimize replication of nearly identical data between a source and target site. In various embodiments, a replicated data storage system may receive notification of nearly identical data between a source and target site. In certain embodiments, a replicated data storage system may be enable to analyze a source and/or target site to determine whether data replicated between source and target may be identical or nearly identical. In some embodiments, in the case of identical data or nearly identical data, a replicated data storage system may be enabled to send a set of replication information from the source site to the target site. In these embodiments, a target site may be enabled to analyze the set of replication information to determine whether the data associated with the set of replication information exists at the target site. The target site may be enabled to notify the source site whether the data associated with the set of replication information exists at the target site and have the source site either send the associated data, if the associated data does not exist at the target site, or continue replicating other data from the source site.

Refer to the example embodiment of FIG. 1. FIG. 1 is a simplified illustration of a replicated data storage system, in accordance with embodiments of the present disclosure. Replicated data storage system (system) 100 includes source system 105 and target system 135. Source system 105 is in communication with target system 135. Both source system 105 and target system 135 are in consistency group 102. Source system 105 includes device 110, replication management module 115, and data management module 120. Data management module 120 includes an Address to Hash Handle (A2H) module 125 and Hash Metadata (HMD) module 130 to manage data stored on device 110. Source system 105 is enabled to provide data storage from device 110 to application 160 and user 165. Target system 135 includes replicated device 140, replication management module 142, and data management module 145. Data management module 145 includes A2H module 150 and HMD module 155 for managing data stored on replicated device 140. In this embodiment, source system 105 uses replication management module 115 to replicate data from device 110 to replicated device 140 on target system 135.

Figure 2:
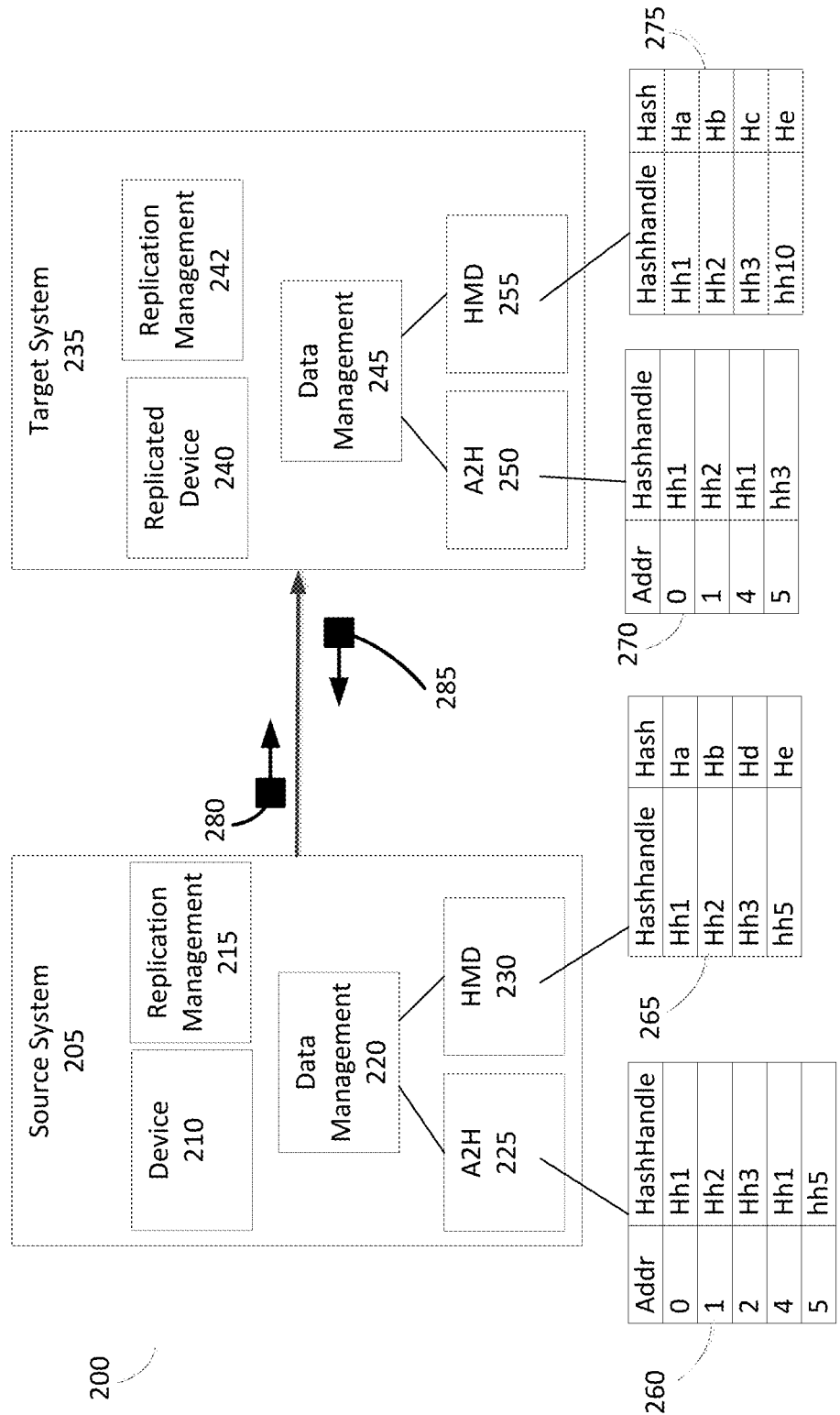
FIG. 2 is an alternate simplified illustration of a replicated data storage system, in accordance with an embodiment of the present disclosure.

Refer to the example embodiment of FIG. 2. FIG. 2 is an alternate simplified illustration of a replicated data storage system, in accordance with an embodiment of the present disclosure. Replicated data storage system (system) 200 includes source system 205 and target system 235. Source system 205 includes device 210, replication management module 215, and data management module 220. Data management module 220 includes Address to Hash Handle (A2H) module 225 and Hash Metadata (HMD) module 230. A2H module 225 manages table 260, correlates addresses on device 210 to hash handles. HMD module 230 manages table 265 which correlates hash handles to hashes of data stored on device 210. Target system 235 includes replicated device 240, replication management module 242, and data management module 245. Data management module 245 includes Address to Hash Handle (A2H) module 250 and Hash Metadata (HMD) module 255. A2H module 250 manages table 270 which correlates addresses on replicated device 240 to hash handles. HMD module 255 manages table 275 which correlates hash handles to hashes of data stored on replicated device 240. Source system 205 is enabled to replicate data from device 210 to target system 235 using message 280 and message 285.

Figure 3A:
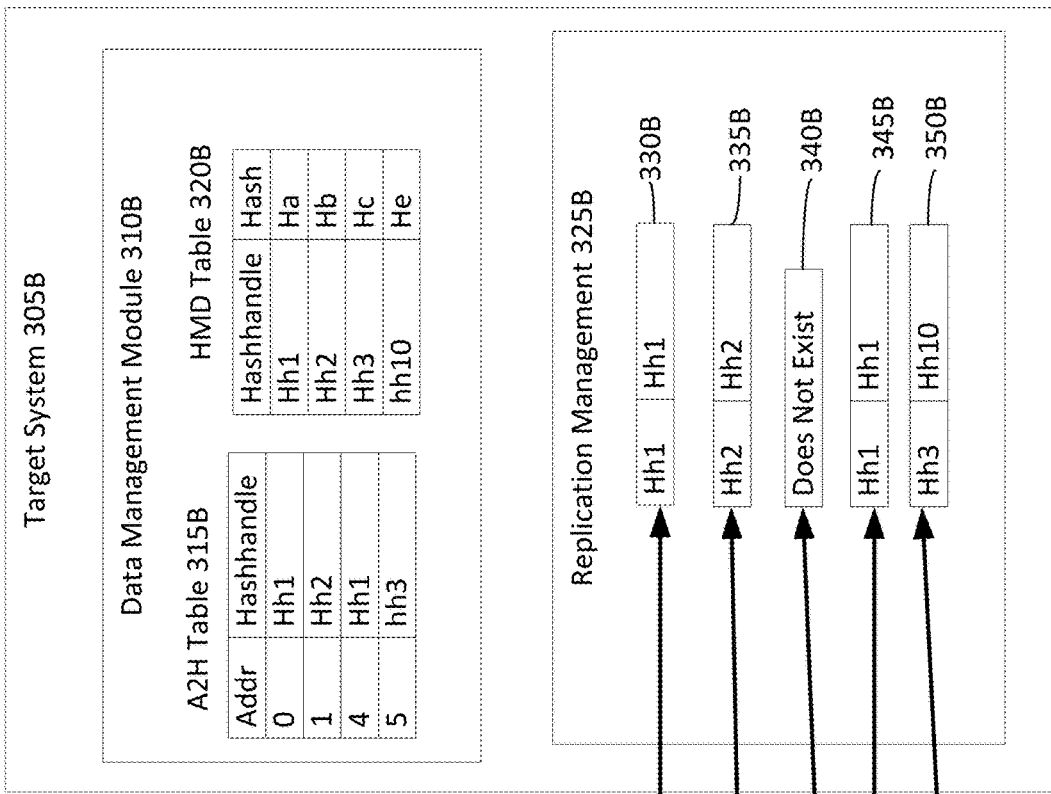
FIG. 3A is a simplified illustration of the replicated data storage system (as shown in FIG. 2) managing replication of identical or nearly identical data, in accordance with an embodiment of the present disclosure.
Figure 3A:
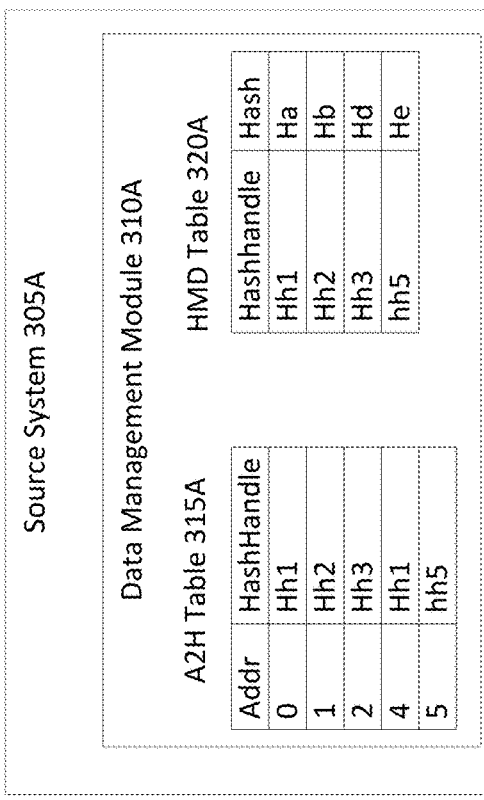
Figure 3A:
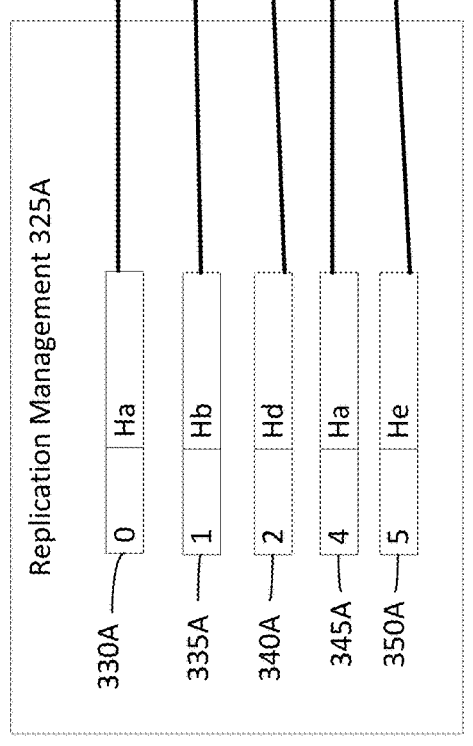

Refer to the example embodiments of FIGS. 3A and 3B. FIG. 3A is a simplified illustration of the replicated data storage system (as shown in FIG. 2) managing replication of identical or nearly identical data, in accordance with an embodiment of the present disclosure. In this embodiment, the replicated data storage system (system) 300 includes source system 305A and target system 305B. Data management module 310A manage data storage devices on source system 305A. Data management module 310B manages data storage devices on target system 305B. Source system 305A receives notification that data on source system 305A and data on target system 305 are identical or nearly identical and initiates replication using replication management module 325A. In many embodiments, a user and/or admin may be enabled to designate a threshold at which a device and a replicated device are identical or nearly identical.

Replication management 325A queries A2H table 315A and HMD table 320A to create messages 330A, 335A, 340A, 345A, 350A. Messages 330A, 335A, 340A, 345A, 350A correlate an address of data stored on source system 305A with a hash of the data stored on source system 305A. Replication management module 325B receives message 330A and queries A2H table 315B and HMD Table 320B for hash handles associated with message 330A. Replication management module 325B retrieves information 330B. As both hash handles in information 330B are the same, replication management 325B returns a success signal. Similarly, when replication management module 325B receives message 335A and message 345A, the hash handles retrieved from the data management module 310B are the same, thereby showing that the data exists and is properly associated with the address on the target system 305B. Thus, Replication management module 325B would return a success signal in response to receiving any of messages 330A, 335A, or 345A.

In this embodiment, the exceptions are message 340A and message 350A. Upon receipt of message 340A, replication management module 325B queries data management module 310B and determines that the data associated with message 340A does not exist on the target system 305B. Replication management module 325B sends a failure signal to replication management module 325A which causes source system 305A to replicate data associated with message 340A. Upon receipt of message 350A, replication management 325B queries data management module 310B for information 350B. Replication management 325B determines that the hash handles in information 350B do not correspond. Replication management 325B updates the A2H Table 315B and responds to message 350A with a success signal.

FIG. 3B is a simplified illustration of a replicated data storage system after replication has been completed, in accordance with an embodiment of the present disclosure. As shown in FIG. 3B, replication between source system 305A and target system 305B has been completed. Within data management module 310B, A2H table 315B and HMD Table 320B have been updated. Specifically, data associated with Hash Hd has been sent from source system 305A and both the A2H table 315B and HMD Table 320B entries have been updated to reflect the newly received data. In addition, the A2H Table 315B has been updated at address "5" to correlate with "hh10" such that the address and hash are similarly associated on both source system 305A and target system 305B.

Figure 4:
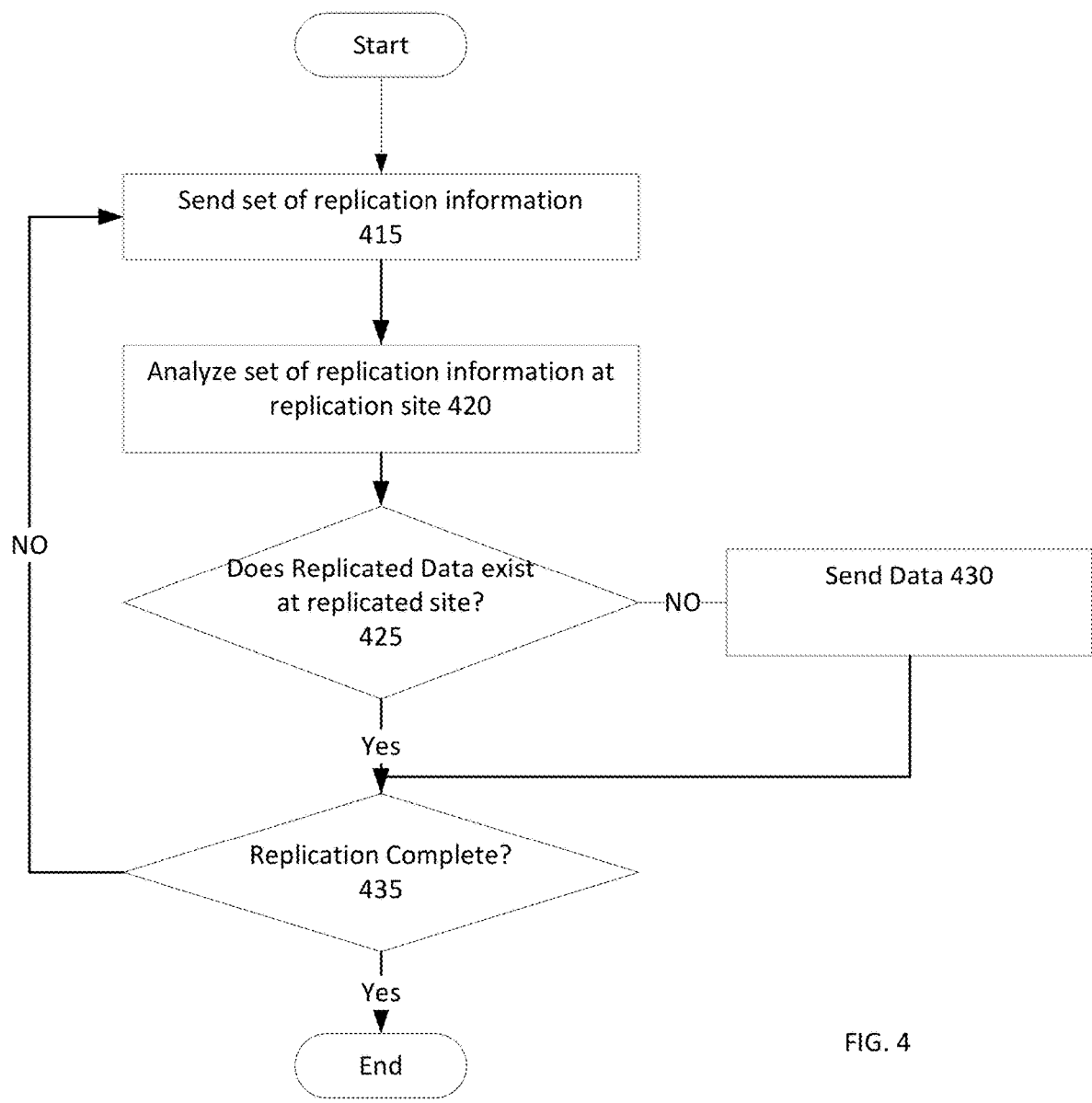
FIG. 4 is a simplified flowchart of a method of managing a replicated data storage system (FIG. 2), in accordance with an embodiment of the present disclosure.

Refer to the example embodiments of FIGS. 2 and 4. FIG. 4 is a simplified flowchart of a method of managing a replicated data storage system (FIG. 2), in accordance with an embodiment of the present disclosure. Replicated Data system (System) 200 includes source system 205 and target system 235. Source system 205 includes device 210, replication management module 215, and data management module 220. Target system 235 includes replicated device 240, replication management module 242, and data management module 245. Source system 205 receives notification that data on device 210 is either identical or nearly identical to data on replicated device 240. Source system 205 provides this information to replication management module 215. Replication management module 215 modifies management of replication between source system 205 and target system 235 in relation to device 210 and replication device 240. Replication management 215 queries data management module 220 for a set of replication information. In many embodiment, a set of replication information may include an address of data stored on a device (i.e., device 210) and the hash associated with the address. Replication management module 215 sends the set of replication information in message 280 to target system 235 (Step 415).

Target system 235 receives message 280 and analyzes the set of replication information at the target system 235 (Step 420). Replication management module 242 queries data management module 245 for information related to the received message 280 and determines whether the data associated with message 280 exists on the replicated device (Step 240). Upon a negative determination, replication management module 242 sends a failure signal in message 285 to replication management module 215. Upon a positive determination, replication management module 242 sends a success signal in message 285 to replication management module 215. Upon receiving a failure signal at replication management module 215, the replication management module 215 sends the data associated with the set of replication information send in message 280 (Step 430). Upon receiving a success signal, replication management module 215 continues onto the next replication I/O or makes a determination that replication is complete (Step 435).

Figure 5:
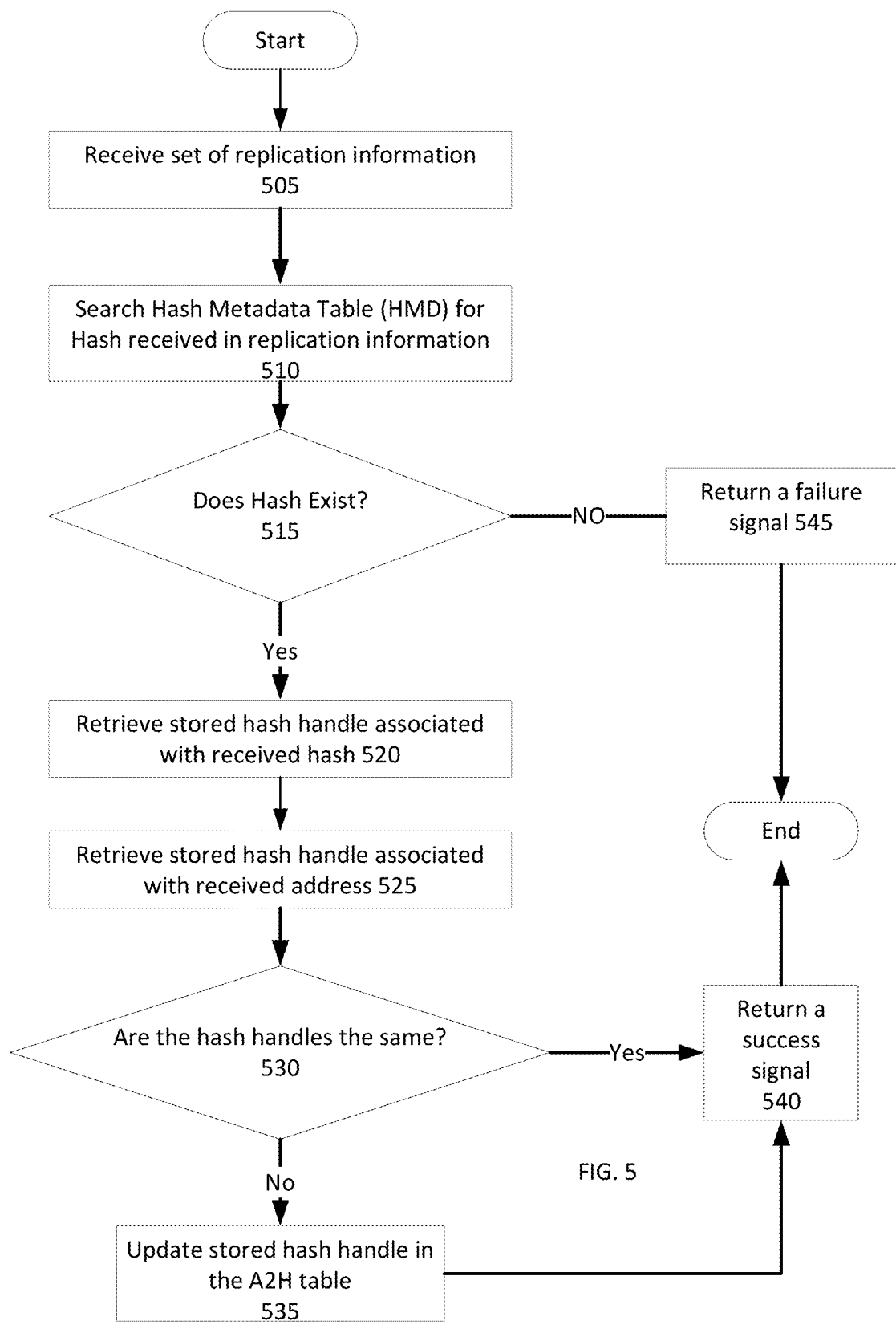
FIG. 5 is a simplified flowchart of a method of analyzing a set of replication information in a system as shown in FIG. 2, in accordance with an embodiment of the present disclosure.

Refer to the example embodiments of FIGS. 2 and 5. FIG. 5 is a simplified flowchart of a method of analyzing a set of replication information in a system as shown in FIG. 2, in accordance with an embodiment of the present disclosure. System 200 includes source system 205 and target system 235. Source system 205 is replicating data from device 210 to replicated device 240 on target system 235. Replication management module 242 receives message 280 which includes replication information from source system 205 in relation to device 210 (Step 505). Replication management module 242 queries data management module 245 to search HMD table 275 for the hash received in message 280 (Step 510). Replication management module 242 makes a determination as to whether the associated Hash exists (Step 515). Upon a negative determination, replication management module 242 returns a failure signal (Step 545) in message 285 to source system 205 and will await data associated with message 280.

Upon a positive determination, replication management module 242 retrieves the stored hash handle associated with the received hash (Step 520) from data management module 245 and replication management module 242 retrieves the stored hash handle associated with received address (Step 525) from data management module 245. Replication management module 242 compares the retrieved hash handles and makes a determination as to whether the hash handles are the same (Step 530). Upon a positive determination, replication management module 242 reutrns a success signal to replication management module 215 on source system 205 (Step 540). Upon a negative determination, replication management module 242 updates the stored hash handle in the A2H table 270 accessed through data management module 245 (Step 535) then replication management module 242 returns a success signal to replication management module 215 (Step 540).

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 6:
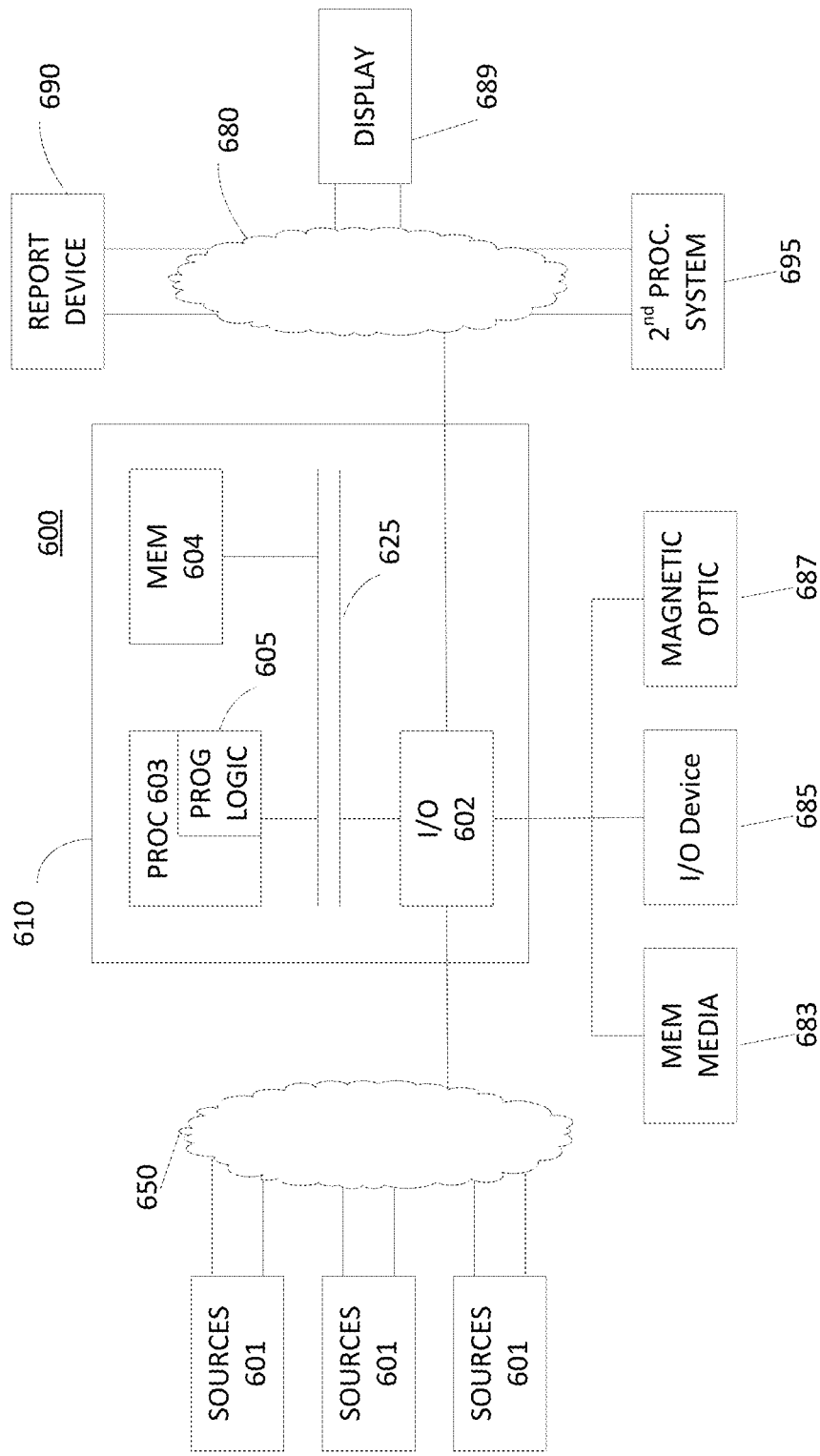
FIG. 6 is an example of an embodiment of an apparatus that may utilize the techniques described herein, in accordance with an embodiment of the present disclosure.

FIG. 6 is a block diagram illustrating an apparatus, such as a computer 610 in a network 600, which may utilize the techniques described herein according to an example embodiment of the present invention. The computer 610 may include one or more I/O ports 602, a processor 603, and memory 604, all of which may be connected by an interconnect 625, such as a bus. Processor 603 may include program logic 605. The I/O port 602 may provide connectivity to memory media 683, I/O devices 685, and drives 687, such as magnetic drives, optical drives, or Solid State Drives (SSD). When the program code is loaded into memory 604 and executed by the computer 610, the machine becomes an apparatus for practicing the invention. When implemented on one or more general-purpose processors 603, the program code combines with such a processor to provide a unique apparatus that operates analogously to specific logic circuits. As such, a general purpose digital machine can be transformed into a special purpose digital machine.

Figure 7:
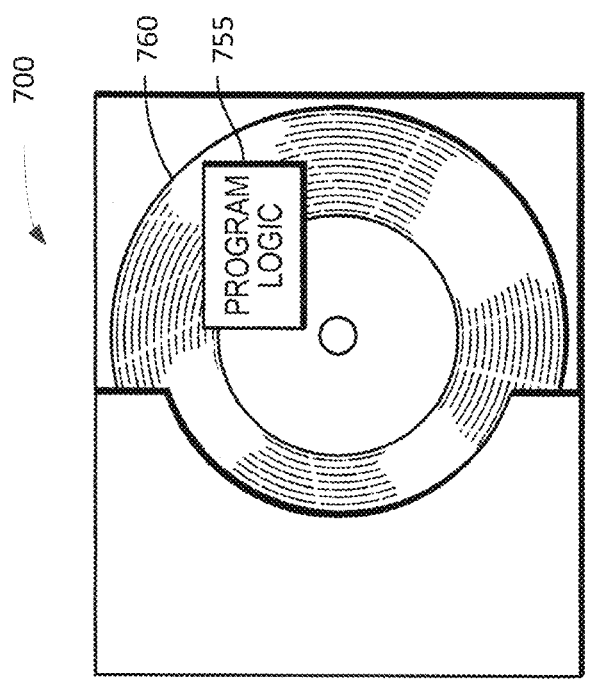
FIG. 7 is an example of a method embodied on a computer readable storage medium that may utilize the techniques described herein, in accordance with an embodiment of the present disclosure.

FIG. 7 is a block diagram illustrating a method embodied on a computer readable storage medium 760 that may utilize the techniques described herein according to an example embodiment of the present invention. FIG. 7 shows Program Logic 755 embodied on a computer-readable medium 760 as shown, and wherein the Logic is encoded in computer-executable code configured for carrying out the methods of this invention and thereby forming a Computer Program Product 700. Program Logic 755 may be the same logic 605 on memory 604 loaded on processor 603 in FIG. 6. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-7. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of optimizing replication between a first Content Addressable Storage (CAS) system and a second CAS system, the computer-executable method comprising:
   analyzing the first CAS system and the second CAS system to determine an amount of differences between the first CAS system and the second CAS system;
   upon determining that the amount of differences is below a threshold amount,
   sending a set of replication information to the second CAS system, wherein the set of information includes a first address and a first hash for a portion of data stored on the first CAS system;
   analyzing, at the second CAS system, the set of replication information to determine whether to request that the first CAS system send data associated with the set of replication information, wherein the analyzing comprises determining, at the second CAS system, hash handles associated with the first address and the first hash;
   upon a negative determination, sending the data associated with the set of replication information.

2. The computer-executable method of claim 1, wherein the analyzing comprises:
   creating, at the second CAS system, a first hash handle associated with the first hash received from the first CAS system;
   searching a hash metadata table (HMD), at the second CAS system, to determine whether the first hash handle exists;
   upon a negative determination, returning a failure signal to the first CAS system.

3. The computer-executable method of claim 1, wherein the analyzing comprises:
   creating, at the second CAS system, a first hash handle associated with the first hash received from the first CAS system;
   determining whether the first hash handle exists on the second CAS system;
   upon a positive determination, comparing the first hash handle with a second hash handle, wherein the second hash handle is associated with a second address within an address to hash handle (A2H) table on the second CAS system;
   upon determining that the first hash handle and the second hash handle are identical, returning a success signal to the first CAS system.

4. The computer-executable method of claim 3, wherein the analyzing further comprises:
   upon determining that the first hash handle and the second hash handle are not identical, updating the second handle with the first hash handle; and
   returning a success signal to the first CAS system.

5. The computer-executable method of claim 1, further comprising:
   upon a positive determination, sending a second set of replication information.

6. A system, comprising:
   a distributed data storage system including a first Content Addressable Storage (CAS) system and a second CAS system; and
   computer-executable program logic encoded in memory of one or more computers enabled to optimize replication between the first CAS system and the second CAS system, wherein the computer-executable program logic is configured for the execution of:
   analyzing the first CAS system and the second CAS system to determine an amount of differences between the first CAS system and the second CAS system;
   upon determining that the amount of differences is below a threshold amount,
   sending a set of replication information to the second CAS system, wherein the set of information includes a first address and a first hash for a portion of data stored on the first CAS system;
   analyzing, at the second CAS system, the set of replication information to determine whether to request that the first CAS system send data associated with the set of replication information, wherein the analyzing comprises determining, at the second CAS system, hash handles associated with the first address and the first hash;
   upon a negative determination, sending the data associated with the set of replication information.

7. The system of claim 6, wherein the analyzing comprises:
   creating, at the second CAS system, a first hash handle associated with the first hash received from the first CAS system;
   searching a hash metadata table (HMD), at the second CAS system, to determine whether the first hash handle exists;
   upon a negative determination, returning a failure signal to the first CAS system.

8. The system of claim 6, wherein the analyzing comprises:
   creating, at the second CAS system, a first hash handle associated with the first hash received from the first CAS system;
   determining whether the first hash handle exists on the second CAS system;
   upon a positive determination, comparing the first hash handle with a second hash handle, wherein the second hash handle is associated with a second address within an address to hash handle (A2H) table on the second CAS system;
   upon determining that the first hash handle and the second hash handle are identical, returning a success signal to the first CAS system.

9. The system of claim 8, wherein the analyzing further comprises:
   upon determining that the first hash handle and the second hash handle are not identical, updating the second handle with the first hash handle; and
   returning a success signal to the first CAS system.

10. The system of claim 6, wherein the computer-executable program logic is further configured for the execution of:
    upon a positive determination, sending a second set of replication information.

11. A computer program product for optimizing replication between a first Content Addressable Storage (CAS) system and a second CAS system, the computer program product comprising:
    a non-transitory computer readable medium encoded with computer-executable code, the code configured to enable the execution of:
    analyzing the first CAS system and the second CAS system to determine an amount of differences between the first CAS system and the second CAS system;
    upon determining that the amount of differences is below a threshold amount, sending a set of replication information to the second CAS system, wherein the set of information includes a first address and a first hash for a portion of data stored on the first CAS system;

analyzing, at the second CAS system, the set of replication information to determine whether to request that the first CAS system send data associated with the set of replication information, wherein the analyzing comprises determining, at the second CAS system, hash handles associated with the first address and the first hash;

upon a negative determination, sending the data associated with the set of replication information.

12. The computer program product of claim 11, wherein the analyzing comprises:
   creating, at the second CAS system, a first hash handle associated with the first hash received from the first CAS system;
   searching a hash metadata table (HMD), at the second CAS system, to determine whether the first hash handle exists;
   upon a negative determination, returning a failure signal to the first CAS system.

13. The computer program product of claim 11, wherein the analyzing comprises:
   creating, at the second CAS system, a first hash handle associated with the first hash received from the first CAS system;
   determining whether the first hash handle exists on the second CAS system;
   upon a positive determination, comparing the first hash handle with a second hash handle, wherein the second hash handle is associated with a second address within an address to hash handle (A2H) table on the second CAS system;
   upon determining that the first hash handle and the second hash handle are identical, returning a success signal to the first CAS system.

14. The computer program product of claim 13, wherein the analyzing further comprises:
   upon determining that the first hash handle and the second hash handle are not identical, updating the second handle with the first hash handle; and
   returning a success signal to the first CAS system.

15. The computer-executable method of claim 11, the code further configured to enable the execution of:
   upon a positive determination, sending a second set of replication information.

16. The method of claim 1 wherein determining that the amount of differences is below a threshold amount further comprises:
   performing a modified replication process based on the determined amount of differences.

17. The method of claim 16 further comprising:
   performing the modified replication process to reduce latency between the first CAS system and the second CAS system.

18. The method of claim 17 wherein latency is reduced by reading a hash handle on the second CAS system instead of the first hash, wherein the hash handle is associated with the first hash.

19. The method of claim 16 further comprising:
   performing the modified replication process to reduce an amount of time required to complete replication between the first CAS system and the second CAS system.

20. The method of claim 1 wherein determining that the amount of differences is below a threshold amount further comprises:
   determining that data on the second CAS system is nearly identical to data on the first CAS system.

* * * * *